Aug. 25, 1970 F. H. RAYMOND 3,525,986
ELECTRIC DIGITAL COMPUTERS
Original Filed May 28, 1957
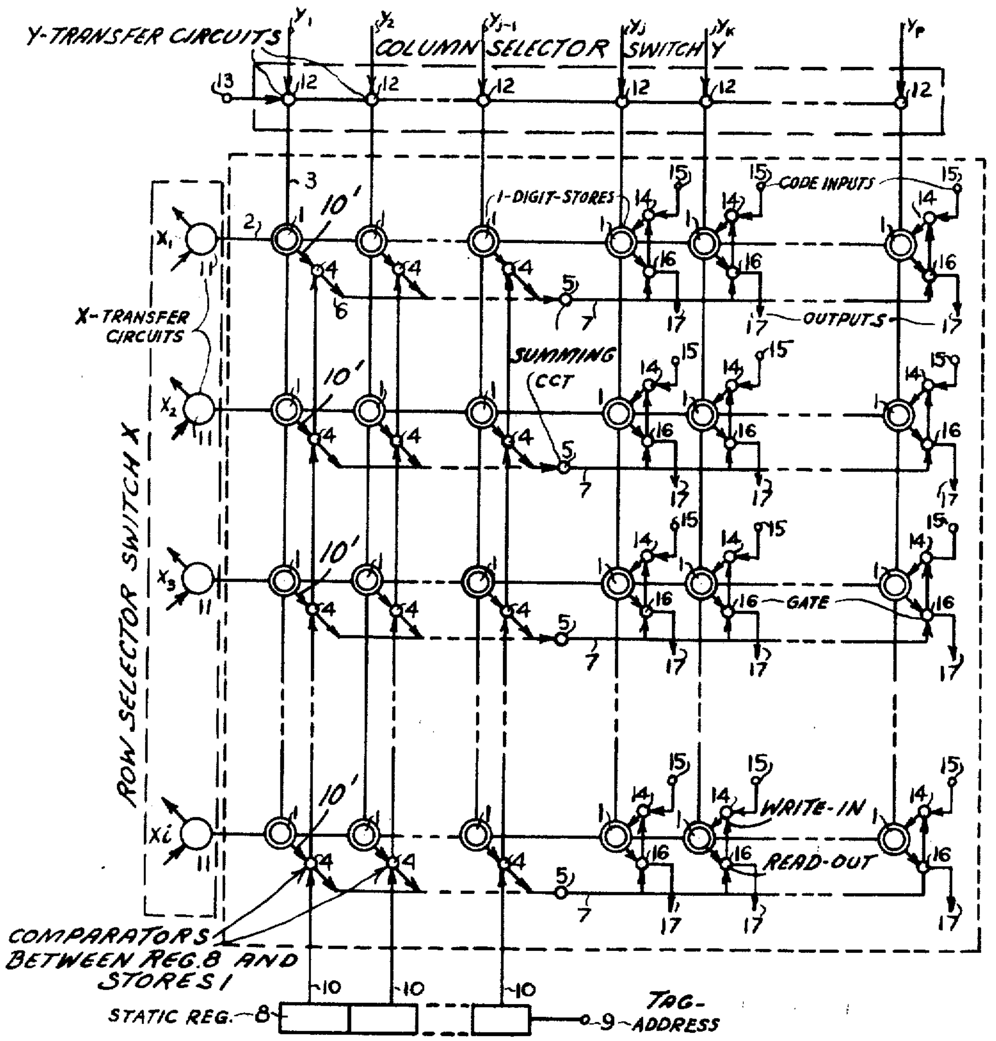
INVENTOR.
FRANCOIS HENRI RAYMOND
BY Theodore Haubner
Attorney United States Patent Office 3,525,986

Patented Aug. 25, 1970

3,525,986

ELECTRIC DIGITAL COMPUTERS

Francois Henri Raymond, Saint-Germain-en-Laye, France, assignor, by mesne assignments, to Compagnie Internationale pour l'Informatique, Louveciennes, France, a corporation of France Continuation of application Ser. No. 662,260, May 28, 1957. This application Oct. 14, 1968, Ser. No. 768,217

Claims priority, application France, July 5, 1956, 718,058

Int. Cl. G11c *15/00*

U.S. Cl. 340—172.5 14 Claims

ABSTRACT OF THE DISCLOSURE

A general purpose computer has a fast access storage matrix which includes means for selecting a storage line on the basis of information stored in the line of the matrix. The matrix arrangements may also include means for selecting the storage location on the basis of its address.

This is a continuation of Ser. No. 662,260 filed May 28, 1957.

The present invention relates to electric digital computers of the so-called general purpose kind, operating upon numerical words, most frequently written in the binary system of numeration, and capable of executing in an automatic fashion any computation process defined by an instruction program stored in otherwise well known manner.

An instruction program comprises a sequence of instruction words, the content of each word defining an elementary order to execute a simple arithmetical, logical or functioanl operation. Each word has a predetermined and constant number of digital places and, when called for execution, is first analysed within a special part of the computer where the various information components making up the word, are isolated. One of these components is always present; it consists of a code representing a function symbol or "letter" which defines the elementary operation itself to be executed. In most instruction words there also appears a further component denoting a storage "address" of at least one numerical data located at some place of the computer store and which is the number to be processed or handled according to the function symbol in the instruction. In certain computers, a single instruction word may contain several addresses.

The store of such a computer also contains numerical data to be handled or processed. They appear as number-words having a predetermined number of digits, most frequently of the same number of digits as the instruction-words of the computer. Frequently also both number-words and instruction-words are classified without any distinction in the main computer store and as a result the computer is caused to discriminate because a number-word is used in quite a different way than an instruction-word. Generally, a number-word froms a whole which cannot be analysed and separated as an instruction-word.

Frequently also, at least part of the operation of such a computer involves a series of steps representing a cyclical operation. Usually, in this case, the length in time of an instruction or number-word coincides with the length of time of any minor cycle of operation of the computer, as defined by its time bases.

A general purpose digital computer operating in accordance with variable instruction programs established by the computer operator consists of the following elements.

Input and output equipments introduce number and instruction words into the computer stores and extract from the computer stores the results of a computation process.

At least one erasable store, and frequently a group of separate stores at least some of which are erasable, stores the instruction and number-words.

A time base unit controls timing of computer operation.

An arithmetical unit effects word combinations and/or manipulations of words.

A program control unit controls the storing of a program and its execution.

A manual control unit initiates, stops or performs any other type of computer operation.

Such elements are disclosed, for example, in the article describing the general purpose computer SEAC in Proceedings of the IRE, October 1953, pages 1300–1313 (see for example page 1302 Machine Organs).

For the actual purpose of the invention, it will be sufficient to consider an assembly including one or several stores, an arithmetical unit and part of the program control unit, the other usual components of a digital computer remaining of conventional structure.

The program control unit contains two main components: A sequence control member or counter, and a one-instruction-word store associated with a decoder. The program control unit further includes specialized arrangements for reading out the informations from the stores and writing back into the stores results of manipulation. It also includes an arrangement to generate and distribute the phase signals for executing the instructions of a program.

The sequence control member may consist of some kind of accumulator starting from a zero content at the beginning of a computation process with its content regularly increasing by one unit each time a fresh instruction is called or executed by the program store upon the one-word instruction store, unless an instruction itself either contains or from its execution leads to an order to break such a continuous sequence in the stored program.

Normally, at each instant of execution of a program, the sequence control member contains an address of its word-instruction.

A break of sequence resulting from the very content of an instruction, as decoded from the one-word instruction store, is called an unconditional break. On the other hand, such a break of sequence may or may not result from checking certain properties of a result of operation ordered by an instruction. Such a break of sequence is called a conditional break, as seen from the instruction program.

In any case, the end of execution of an instruction depending upon the content of the one-word instruction store controls the call of a further instruction from the normal store of the computer. Generally speaking, it results from analysing (or decoding) an instruction frequently calling at least one number-word from the normal store to the arithmetical unit; and it controls the storing of a result of the arithmetical unit into a store of the computer.

The structure of the arithmetical unit varies from one computer to another; it is essentially adapted to that kind of general computation intended for the use of the computer. It always includes, however, a certain number of one-word stores, usually arranged as accumulators, and an organization to check the contents of the stores for the execution of conditional break of sequence instructions.

The general store of a computer frequently has a rather large word capacity. For technological considerations such a general store has been divided into at least two parts, one part of a large word capacity which at least presently excludes a conveniently slow access time and another part or parts of a restricted word capacity but of fast access type.

The access time of a store may be defined as the time interval necessary for recording or extracting a word. In a large capacity store, for example, a magnetic drum, the average access time equals one half of a major cycle of the computer timing, provided such a major cycle corresponds to the time of one drum rotation. In a fast access store, this time interval is reduced to not less than one minor cycle if a word has that time capacity or duration and is recorded to read out in a series fashion; it is reduced to at least one pulse period if a word is recorded or readout in a parallel digit fashion.

Since it is now considered to be conventional to transfer blocks of information words between a main and slow access store and at least one fast access store, there will be no further need in the following to refer to slow access stores for computers.

As to fast access stores, more particularly though not exclusively, the present invention applies to the so-called matricial store which consists of one-digit stores arranged in rows and columns. Each one-digit store is adapted to store a single binary information bit or digit.

Such a matricial store is disclosed for example in the article by Jan. A. Rajchman entitled "A Myriabit Magnetic-Core Matrix Memory," Proceedings of the IRE, 1953, pages 1407–1421; see particularly FIGS. 1, 7 and 8.

For selecting a word location in such a store, the decoded address of an instruction will indicate in any conventional computer a row number, X together with a number of column numbers, $Y_j$ to $Y_k$. Upon and under control of the decoding of such an address in an instruction-word, two routing registers for rows and columns, respectively, associated with this type of store are operated in well-known manner as for example indicated in FIG. 8 of the above-mentioned Rajchman article.

Alternatively, however, a word location in such a store may be indexed in a different fashion derived for example simultaneously from a selection process by comparing each address of a store or a portion thereof with the address to be selected as previously disclosed in applicant's U.S. Pat. No. 2,670,463 filed July 13, 1950. While this disclosure applies to a remote selection system, it is readily applicable to the type of computer store mentioned above.

By incorporating such a selection process by comparison in a computer store, dual selection stores may be obtained as will be described more fully with reference to FIG. 1 of the accompanying drawings.

In the figure, a dual selection store according to the invention is shown to possess $n$ rows, from $x_1$ to $x_n$, and $p$ columns, from $y_1$ *to* $y_{j-1}$ for a first group, and from $y_j$ to $y_p$ for a further group. The one-digit stores are shown at 1, arranged as usual, at the intersections of these rows and columns. One digit stores 1 may each comprise at least one magnetic core of a material having a quasi rectangular hysteresis cycle. As apparent from the above-mentioned Rajchman article, all cores can be magnetized to one or the other of the remnant inductance represented respectively by the top and bottom points (P, N) of this hysteresis cycle. The activation lead of a row connecting the horizontal recording windings of stores 1 in series is indicated at 2. The activation lead 3 of a column connecting the vertical recording windings of stores 1 in series is indicated at 3. Each of leads 2, 3 terminates on transfer circuits 11, 12 respectively of routing switches $x$, $y$, see for example FIG. 8 of the above-mentioned Rajchman article which are selectively activated first transfer circuit 11, and then transfer circuit 12 are sequentially activated to sequentially superimpose upon selected cores of a selected row positive or negative recording pulses or to derive output pulses from a store or stores thus selected. During the activation of one row $x_y$, and the sequential activation of predetermined part $y_1$ to $y_{j-1}$ of columns, $y_1$ to $y_p$, a numerical code will be introduced into or read-out from stores 1 as disclosed in the above-mentioned Rajchman article especially with respect to FIG. 8. In such a selection and control process, the "address" proper will have been previously decoded from the content of the one-word instruction store of the computer.

Another mode of selection in such a store is effected by comparing part of the contents of each rows $x_1$ to $x_i$, for example columns $y_1$ to $y_{j-1}$, with an undecoded "address" introduced through input 9 into static register 8. The outputs 10 of the register 8 are connected through comparing arrangement 4 with readout leads 10' of one-digit stores $y_1$ to $y_{j-1}$ of each row. As disclosed in the above-mentioned U.S. patent specification 2,670,463 (see for example FIG. 1 and FIG. 4, part 5) comparing arrangements 4 serve to compare the content of register 8 derived from readout lead 10 with the content of stores 1 derived from readout lead 10' to determine the one or zero digital condition of the concerned one-digit stores 1 concerned. Each of readout leads 10 reaches a complete column of readout leads 10' of stores 1. On the other hand, the outputs 6 of comparing arrangements 4 distributed in columns from $y_1$ to $y_{j-1}$ along a single row 2, are grouped and led into the input of a summing circuit 5. Summing circuits 5 of each row will deliver at its own output 7 a voltage of predetermined amplitude and polarity only when the one-digit stores 1 associated therewith contain a binary code record coinciding with that stored in static register 8.

A circuit consisting of a plurality of arrangements 4 associated with a single circuit 5 may be realised in various ways other than disclosed in the above-mentioned U.S. patent specification 2,680,476. The circuits 5 of the other rows will deliver a different signal in case they do not contain the same numerical code as that recorded at static register.

In case, of course, several rows should contain such a numerical code, several circuits 5 will be simultaneously energized.

Thus, in accordance with the invention, the recording of a complete word may be realised by an X, Y selection, and its reading-out may be realised by a comparison selection of part of the word with a numerical selection code set up in register 8. Each complete word, when intended to be read by means of such selection process, may then comprise two parts, an information and a "tag" or "prefix" (consisting of digits such as $y_1$ to $y_{j-1}$).

It is apparent, however, that an information word may be recorded into the store as well as read-out therefrom only by means of the conventional selection process using an X, Y address. In such case no discrimination in the content of such an information word takes place.

In accordance with the invention, furthermore, an auxiliary arrangement is established in such a store to permit recording and reading by using a tag. In such auxiliary arrangement one-digit stores 1 in columns from $y_j$ to $y_p$, are each associated with a pair of transfer gates, input gate 14 and output gate 16, respectively. When, as explained above, a row is selected from the content of static register 8, a gate 14 may be controlled to record upon the other one-digit stores of the selected row the respective digits of a parallel code applied to the input terminals 15 of these gates 14. Alternatively, as the case may be, gates 16 may be controlled to deliver at their output leads 17 the digits previously recorded on the one-digit stores 1 concerned of the selected row. This second method may be used for example after completion of the first method to modify the content of part of an information in a store thus-established.

All the one-digit stores, of course, of this type of storage arrangement may be provided with both a circuit arrangement such as shown at 4 and a circuit arrangement such as shown at 14–16. Several sets of summing circuits such as shown at 5 may also be provided, and in the operation of such a complete dual selection store, additional switching means may be used under control of an instruction program to selectively connect summing circuits 5 to various parts of the one-digit stores. Similarly, several registers such as shown at 8 may be connected through switching arrangements with different parts of the store according to specialised program instructions of the computer.

Thus, for example, as apparent from FIG. 1, store rows $x_1$, $x_2$, $x_3$ and $x_n$ may have recorded thereon in columns $y_1$, $y_2$, $y_{j-1}$, $y_j$, $y_k$ and $y_p$ the following code elements:

| | $y_1$ | $y_2$ | $y_{j-1}$ | $y_j$ | $y_k$ | $y_p$ |
|---|---|---|---|---|---|---|
| $x_1$ | 1 | 0 | 0 | 1 | 1 | 0 |
| $x_2$ | 0 | 1 | 0 | 0 | 1 | 0 |
| $x_3$ | 1 | 1 | 1 | 1 | 0 | 0 |
| $x_n$ | 1 | 0 | 1 | 1 | 0 | 1 |

Selecting register 8, on the other hand, may have received thereon the following four code elements:

1 1 1 1

Under control of normal selection read-ins in the form of negative pulses applied over transfer circuits 11, read-out circuits 10' will deliver the contents of stores 1 of row $x_1$, $x_2$, $x_3$, $x_n$ to one input of comparators 4. At the same time, the contents of register 8 will be delivered to another input 10 of comparators 4. The outputs 6 of comparators 4 are applied to and added in summing circuits 5 having their outputs applied to readout gates 16. There the sums reaching a predetermined amplitude, i.e., a maximum amplitude, representing the identity of the code elements $y_1$, $y_2$, $y_{j-1}$, $y_j$ with the corresponding code elements of selecting register 8, will identify the selected row, namely row $x_3$, and bias the corresponding read-out gates 16 of row $x_3$ thereby releasing at outputs 17 the contents $y_k$–$y_p$ of the corresponding stores 1, namely the code elements 0—0.

In case magnetic cores are used in the store, the reading-out of the cores from comparing circuits such as shown at 4 may be realised without erasing its registrations when required, by using well-known means such as disclosed in the above-mentioned Rajchman article.

The invention is also applicable to stores adapted for single coordinate selection and in which each word location is denoted by a single address, $X_i$ without requiring any Y's. In this case, the stores comprise a plurality of one-word recirculating loops. Apparently, the invention is applicable because register R may be periodically read out in synchronism with the reading-out of all such loops to cause the code of register R to be compared simultaneously with code portions of the recirculating words.

What is claimed is:

1. In an electrical digital computer of the general purpose type controlled by a stored program, at least one fast access store consisting of a matrix of magnetic cores comprising

- a sequence of core rows forming permanent addresses of word locations;
- switching means connected with at least part of said fast access store for selecting an information location corresponding to a predetermined one of said addresses;
- additional storing means; and
- further means selectively operable for comparing simultaneously at least part of the content of said additional storing means with at least part of the content of a number of said rows of word locations to further select a predetermined one of said addresses upon having established identity between said content parts.

2. In an electrical digital computer of the general purpose type controlled by a stored program, at least one fast access store consisting of a matrix of magnetic cores comprising

- a sequence of core rows forming permanent addresses of word locations;
- sequential switching means connected with at least part of said fast access store for selecting information corresponding to a predetermined one of said addresses by standing said rows one after another and selected a predetermined row in accordance with the sequential order of its position;
- additional storing means; and
- further means selectively operable for comparing simultaneously at least part of the content of said additional storing means with at least part of the content of a number of said rows of word locations to further select a predetermined one of said addresses upon having established identity between said content parts.

3. A digital computer as claimed in claim 2, further comprising means including a tag preceding the content to be stored in said additional storing means for controlling said additional storing means.

4. In an electric digital computer of general purpose type controlled by a stored program, fast access store means comprising

- a matrix of magnetic cores arranged in columns and rows and forming permanent addresses of word locations, each of said magnetic cores being adapted to store a single binary bit;
- sensing means connected to part of said fast access store means for simultaneously sensing parts of the contents of the word locations in said part of said store means;
- reference means connected to part of said first access store means for providing a reference word;
- comparing means connected to said reference means and to part of said fast access store means for simultaneously comparing a reference word with the contents of the sensed parts of said fast access store means; and
- means connected to part of said fast access store means for writing in and reading out information words to and from the parts of the contents of the word locations of said fast access store means other than the parts sensed by said sensing means.

5. In an electric digital computer as claimed in claim 4, selecting means connected to said comparing means and controlled by said comparing means for selecting the means for writing in and reading out information words for the word location for which the part sensed by said sensing means compares with the reference word.

6. A switching arrangement for producing an output signal at a selected one of a plurality of output leads in accordance with the binary states of the digits of an input code, said arrangement comprising

- storage elements S11, S12 . . . SIN arranged in a first row, storage elements S21, S22 . . . S2N arranged in a second row . . . and storage elements SM1, SM2 . . . SMN arranged in an Mth row;
- comparators C11, C12 . . . CIN, C21, C22 . . . C2N, and CM1, CM2 . . . CMN coupled to said storage elements, respectively;
- output circuits 01, 02 . . . OM coupled to all comparators in a corresponding row, respectively;
- a signal generator for receiving said input code and for producing corresponding control signals for each binary digit thereof; and
- means coupling said signal generator and said output circuits to said storage elements and comparators to derive therefrom said output signals to represent all of the comparisons performed along a corresponding row, the condition of all comparisons along a row determining the state of the output signal produced by the corresponding output circuit.

7. A switching device for producing an output signal on one of a plurality of output leads according to the binary representation of an input code, said device comprising a plurality of storage elements arranged in rows and columns, said rows corresponding in number to the number of said output leads and said columns corresponding in number to the number of binary digits in said input code; interrogation signal generator means for producing interrogation signals corresponding respectively to the binary digits of said input code; a plurality of comparator means in each of said rows with each comparator means coupled to a separate corresponding one of said storage elements; means for applying each interrogation signal produced by said signal generator to said comparator means; means in circuit connection with each of said comparator means for interpreting the signal received from said signal generator means and the state of the corresponding storage element to produce an output signal indicating the comparison therebetween; and output means connected to said rows of said storage elements and comparator means to produce said output signals, each output signal representing the result of all comparisons performed along a corresponding row.

8. A searching device for simultaneously interrogating an array of storage elements to detect the presence and position of a predetermined pattern therein, the array of storage elements being arranged in rows and columns, each row representing a unit of information, and each column representing the same bit for every row, said searching device comprising interrogation signal generator means adapted to produce a plurality of interrogation signals in accordance with said predetermined pattern, each interrogation signal corresponding to a respective bit of said predetermined pattern;

a plurality of comparators coupled to corresponding storage elements;

means for applying each interrogation signal to the comparators, in a corresponding column of the array, each comparator being adapted to produce a comparison signal indicating the identity or nonidentity of the corresponding storage element with respect to the interrogation signal applied thereto; and a plurality of output circuits coupled to each comparator in a corresponding row of the array, each of said output circuits being adapted to produce an output signal indicating the presence or absence of said predetermined pattern in the corresponding row when there is an interrogation by said interrogation signals.

9. A dual selection digital storage system comprising a plurality of digital storage elements arranged to form a matrix of a plurality of rows and columns of said elements, column and row selector means connected to record digital information in said elements and to read out digital information from said elements, a source of coded signals having a pre-determined number of binary digits, means for comparing each digit of said coded signals with digital information stored in a separate column of said matrix, and means responsive to said comparison of coded signals with information stored in said matrix for providing a separate output signal corresponding to the relative identity of said coded signals and the digital information stored in the elements of pre-determined columns of each row of said matrix.

10. The dual selector system of claim 9, comprising a source of parallel input signals, and gate means connected between said source of parallel input signals and said matrix and responsive to said output signals for selectively applying said input signals to a predetermined separate element of a row of said matrix.

11. The dual selection system of claim 9, comprising a plurality of output leads, and gate means connected to said matrix and said output leads and responsive to said output signals for selectively applying digital information stored in predetermined elements of said matrix to said output leads.

12. A digital storage system comprising a plurality of digital storage elements arranged to form a matrix of plurality of rows and columns of said elements, whereby said rows of elements form addresses of work locations, switching means coupled to said elements for selecting an information location corresponding to a predetermined one of said addresses, a source of coded signals having a predetermined number of binary digits, means for comparing each digit of said coded signals with the contents of the storage elements of a separate column of said matrix, and means responsive to said comparison of coded signals with the contents of said storage elements for providing a separate output signal corresponding to the relative identity of said coded signals and the contents of elements of each row of said matrix.

13. A digital storage system comprising a plurality of digital storage elements arranged to form a matrix of a plurality of rows and columns of said elements, whereby said rows of elements form addresses of work locations, a source of coded signals having predetermined number of binary digits, means coupled to said matrix and said source of coded signals for comparing each digit of said coded signal with the contents of the storage element of a separate column of said matrix, and means responsive to said comparison of coded signals with the contents of said storage elements for providing a separate output signal corresponding to relative identity of said coded signals and the contents of the elements of each row of said matrix.

14. A switching system for producing an output signal on one of a plurality of output leads according to the binary representation of an input code, said system comprising a plurality of devices arranged in rows and columns, said rows corresponding in number to the number of said output leads and said columns corresponding in number to the number of binary digits in said input codes, each said device comprising a separate binary storage element and a separate comparator means coupled to the respective storage column, interrogation signal generator means for producing interrogation signals corresponding respectively to the binary digits of said input code, means for applying each interrogation signal corresponding to a separate binary digit of said input code to the comparator means of a separate column of said matrix, and means coupling each comparator means of a common row to a common output lead, whereby each said output lead corresponds to a separate row of said matrix, whereby said comparator means of each row applies an output signal to the corresponding output lead representing the result of all comparison performed on corresponding row between the interrogation signals and the storage condition of the respective elements.

References Cited

UNITED STATES PATENTS

| | | | |
|---|---|---|---|
| 2,847,657 | 8/1958 | Hartley et al. | 340—174 |
| 2,885,659 | 5/1959 | Spielberg | 340—174 |
| 2,913,175 | 11/1959 | Williams et al. | 235—157 |

RAULFE B. ZACHE, Primary Examiner